(12) United States Patent
Frey et al.

(10) Patent No.: US 11,809,786 B2
(45) Date of Patent: Nov. 7, 2023

(54) METHOD AND DEVICE FOR GENERATING A DIGITAL MODEL OF A BUILDING

(71) Applicant: Siemens Schweiz AG, Zurich (CH)

(72) Inventors: Christian Frey, Unterägeri (CH); Wolfram Klein, Neubiberg (DE); Hermann Georg Mayer, Prien am Chiemsee (DE)

(73) Assignee: SIEMENS SCHWEIZ AG, Zurich (CH)

( * ) Notice: Subject to any disclaimer, the term of this patent is extended or adjusted under 35 U.S.C. 154(b) by 348 days.

(21) Appl. No.: 17/038,056

(22) Filed: Sep. 30, 2020

(65) Prior Publication Data
US 2021/0103686 A1 Apr. 8, 2021

(30) Foreign Application Priority Data

Oct. 2, 2019 (EP) .................................... 19201114

(51) Int. Cl.
*G06F 30/12* (2020.01)
*G06F 30/13* (2020.01)
*G06T 15/20* (2011.01)
*G06F 111/20* (2020.01)

(52) U.S. Cl.
CPC ............. *G06F 30/12* (2020.01); *G06F 30/13* (2020.01); *G06T 15/205* (2013.01); *G06F 2111/20* (2020.01); *G06T 2215/16* (2013.01)

(58) Field of Classification Search
CPC .......... G06F 30/00; G06F 30/12; G06F 30/13; G06F 2111/20; G06T 15/205; G06T 2215/16

USPC .............................................................. 703/1
See application file for complete search history.

(56) References Cited

U.S. PATENT DOCUMENTS

| | | | |
|---|---|---|---|
| 9,852,238 B2 * | 12/2017 | Forsyth | ................... G06F 30/13 |
| 2011/0209081 A1 | 8/2011 | Chen et al. | |
| 2018/0032643 A1 * | 2/2018 | Wright | .................... G06F 30/18 |

FOREIGN PATENT DOCUMENTS

WO    WO 2009109061 A1    9/2009

OTHER PUBLICATIONS

Van Den Berg, Marc et al., "BIM Uses for Reversible Building Design: Identification, Classification & Elaboration", Oct. 2017. (Year: 2017).*

(Continued)

*Primary Examiner* — Cedric Johnson
(74) *Attorney, Agent, or Firm* — Schmeiser, Olsen & Watts LLP

(57) ABSTRACT

An initial building model is read in and a creator indication about the creator thereof is extracted therefrom. The creator indication is taken as a basis for loading a creator-specific object pattern library in which a respective object pattern has an assigned building element data record. The respective object pattern is correlated with objects of the initial building model by a pattern recognition method. At the same time, an object correlating with the respective object pattern is assigned the building element data record assigned to this object pattern as an annotation. The initial building model and the assigned annotations are then taken as a basis for generating and outputting an annotated digital building model.

18 Claims, 3 Drawing Sheets

(56) References Cited

OTHER PUBLICATIONS

Dodge, Samuel et al., "Parsing Floor Plan Images", May 8- 12, 2017, 2017 Fifteenth IAPR International Conference on Machine Vision Applications (MVA), MVA Organization. (Year: 2017).*

Dawod, Mohamed et al., "BIM-Assisted Object Recognition for the On-Site Autonomous Robotic Assembly of Discrete Structures", Aug. 21, 2019, Construction Robotics, Springer. (Year: 2018).*

Mayer Hermann: "Digitalization of Legacy Building Data—Preparation of Printed Building Plans for the BIM Process"; Roceedings of the 7th International Conference on Smart Cities and Green ICT Systems; pp. 304-310; XP055681113; DOI: 10.5220/0006783103040310; ISBN: 978-989-7582-92-9; 2018.

* cited by examiner

METHOD AND DEVICE FOR GENERATING A DIGITAL MODEL OF A BUILDING

CROSS-REFERENCE TO RELATED APPLICATIONS

This application claims priority to European Application No. 19201114.6, having a filing date of Oct. 2, 2019, the entire contents of which are hereby incorporated by reference.

FIELD OF TECHNOLOGY

Contemporary digital building models, in particular what are known as BIM models (BIM: Building Information Models), usually contain a multiplicity of building elements that are semantically annotated. A function or meaning of these building elements is therefore not only deducible on the basis of the geometry of the building elements or their position in the building, but is also specified explicitly in machine-readable form. This can prove very advantageous in particular for automatic processing of building models, and in many cases reduces the level of complexity required for creating specific models. As such, specific models for an energy simulation are usually easy to produce from suitable BIM models, or available room information can be used to automatically position fire alarms or create cleaning schedules.

BACKGROUND

Unlike many modern BIM models, conventional building models, e.g. paper blueprints or PDF files comprising CAD designs, usually have no strict semantics and/or only inconsistent semantic annotations, which are capturable only with difficulty by machine. For this reason, deriving simulation models or processing design data frequently entails a high level of manual complexity in the case of conventional building models.

In fact, a large proportion of all building plans are available only in conventional form to date. In many cases they are not digitized further on account of the high level of complexity.

SUMMARY

An aspect relates to a method and an apparatus for generating a digital building model that require a lower level of complexity.

To generate a digital building model, an initial building model is read in and a creator indication about a creator of the initial building model is extracted therefrom. The initial building model may be in particular a scan of a conventional blueprint of a building, a 2D or 3D scan of the building or a CAD or BIM model of the building. A creator can be understood in this instance to mean in particular a designer, an engineer's office, an architect's office, an originator, a supplier, a creation tool and/or another entity involved in creating the initial building model. The creator indication extracted can be in particular a company name, a company logo, a signature and/or a company stamp. The creator indication is taken as a basis for loading a creator-specific object pattern library in which a respective object pattern has an assigned building element data record. An object pattern in this instance may be in particular a pattern representation for a building element. According to embodiments of the invention, the respective object pattern is correlated with objects of the initial building model by a pattern recognition method. The objects to be correlated may be in particular symbols or other representations of building elements. To correlate a respective object pattern with an object of the initial building model, it is in particular possible for a similarity comparison to be performed. According to embodiments of the invention, an object correlating with the respective object pattern is assigned the building element data record assigned to this object pattern as an annotation. The initial building model and the assigned annotations are then taken as a basis for generating and outputting an annotated digital building model.

To carry out the method according to embodiments of the invention, there is provision for an apparatus for generating a digital building model, a computer program product (non-transitory computer readable storage medium having instructions, which when executed by a processor, perform actions) and a computer-readable, preferably nonvolatile, storage medium.

The method according to embodiments of the invention, the apparatus according to the invention and the computer program product according to embodiments of the invention can be implemented in particular by one or more computers, one or more processors, application-specific integrated circuits (ASICs), digital signal processors (DSPs), a cloud infrastructure and/or what are known as "field programmable gate arrays" (FPGAs).

Embodiments of the invention are based inter alia on the observation that, although on the one hand building elements or symbols are not used consistently or not used according to standard in many blueprints, on the other hand many designers, engineer's offices or other creators certainly do adhere consistently to their own or inhouse stipulations. As specific object patterns are thus available for a particular creator, it is thus possible for not just one current blueprint but rather many other blueprints from this creator to be processed. This allows the level of complexity for generating annotated digital building models to be reduced considerably. Furthermore, selection of a creator-specific object pattern library allows the volume of object patterns needing to be recognized to be reduced to the object patterns of a single creator, which can substantially reduce the level of pattern recognition complexity.

According to one advantageous development of embodiments of the invention, a local correlation of a further object with a further annotation can be captured in the initial building model by the pattern recognition method. This allows the further annotation as a building element data record and the further object in the form of a further object pattern to be stored in the creator-specific object pattern library in a manner assigned to one another. A local correlation can be understood in this instance to mean in particular a correlation in respect of a position of and/or a distance between the further object and the further annotation. Further objects that are adjacent to a respective further annotation can preferably be sought in the initial building model. Furthermore, for example a legend from the initial building model can be sought and/or captured by the pattern recognition method. The further objects and further annotations assigned to one another in a legend that is found can be stored accordingly in the creator-specific object pattern library. In this way, creator-specific object pattern libraries can be expanded further and completed by new object patterns and new building element data records in the course of operation. If an object or an object pattern cannot be assigned uniquely, there may advantageously be provision for a building element data record or further details to be requested by a call for user input.

According to another advantageous development of embodiments of the invention, the storage of the further object pattern and/or of the further annotation can be logged in a blockchain. In this way, changes in creator-specific object pattern libraries can be reliably tracked and if need be corrected or reversed. Furthermore, there may be provision for programs or devices, such as e.g. scanners, that are involved in a change in a creator-specific object pattern library to be authenticated, authorized and/or verified beforehand.

The further object can preferably be correlated with object patterns contained in the creator-specific object pattern library, preferably by a similarity comparison. A similarity comparison can be performed in particular by a support vector machine in this instance. If the further object correlates with an object pattern contained in the creator-specific object pattern library, the further object pattern can be stored in the creator-specific object pattern library as an additional representation of this object pattern. Otherwise the further object pattern can be stored in the creator-specific object pattern library in a manner assigned to the further annotation.

The annotation assigned to a respective object can furthermore be output in a manner positionally assigned, in particular adjacently, to this object. The assigned object can also be positionally assigned or positioned in a creator-specific manner if need be.

According to another advantageous embodiment of the invention, the initial building model can be produced by scanning in a building blueprint. In this way, a conventional blueprint can easily be expanded by annotations.

The method according to embodiments of the invention can preferably take place on a scanner or on a scanner/printer combination device. In the case of a scanner/printer combination device, a conventional blueprint can be read in and an automatically annotated version of this blueprint can be printed directly.

A coordinate indication can furthermore preferably be extracted from the initial building model by the pattern recognition method. The initial building model and/or the annotated digital building model can then be scaled on the basis of the captured coordinate indication.

An exemplary embodiment of the invention is explained in more detail below with reference to the drawing, in which, in each case in a schematic depiction:

BRIEF DESCRIPTION

Some of the embodiments will be described in detail, with references to the following Figures, wherein like designations denote like members, wherein.

DETAILED DESCRIPTION

Figure 1:
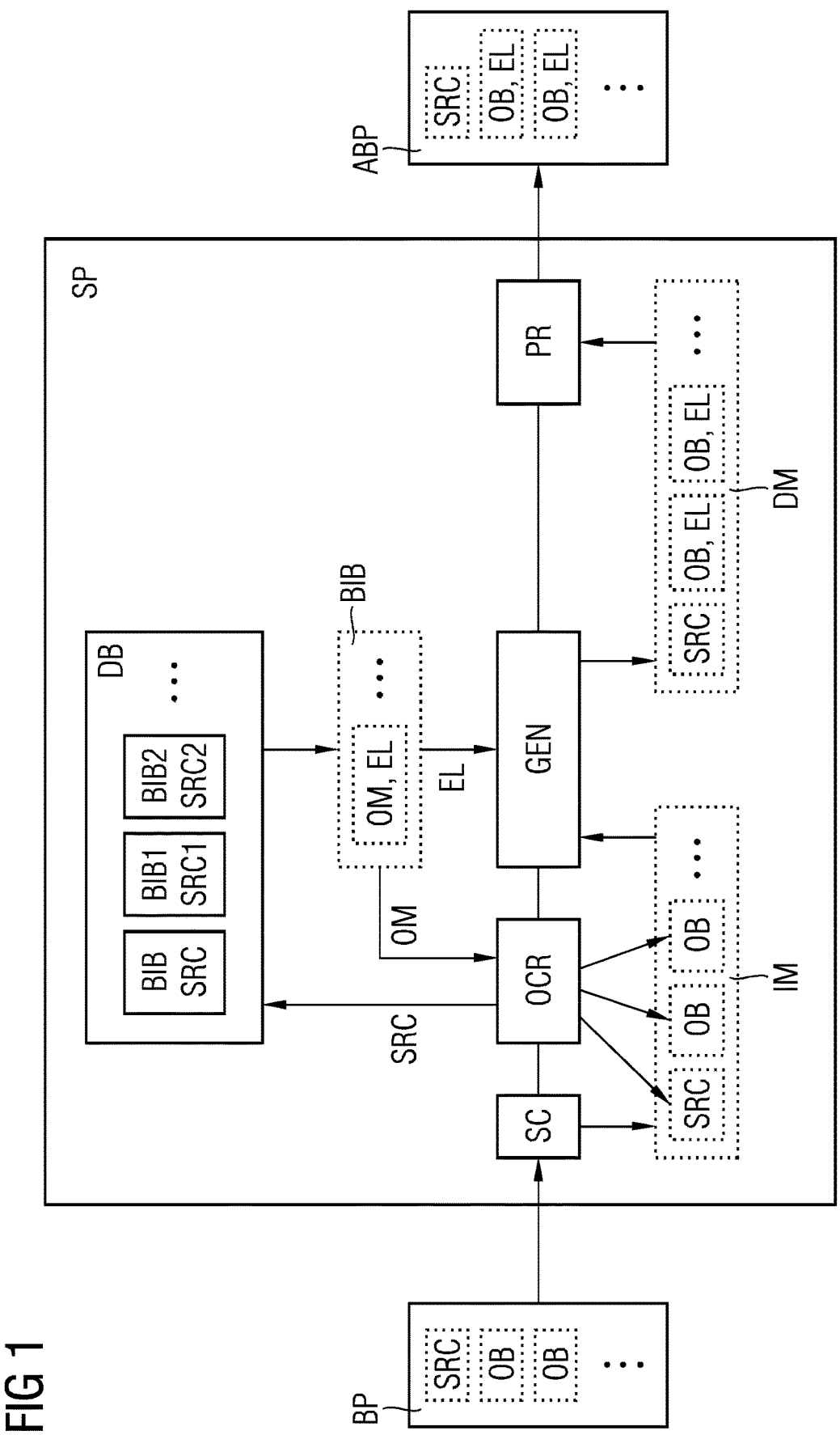
FIG. 1 illustrates an apparatus according to embodiments of the invention for generating an annotated digital building model.

FIG. 1 shows a schematic depiction of an apparatus SP according to embodiments of the invention for generating a digital building model DM. The apparatus in the present exemplary embodiment is implemented as a scanner/printer combination device SP having a scanner SC and a printer PR. As an alternative or in addition to the printer PR, there may also be provision for a BIM planning system. The apparatus SP is used for scanning building blueprints, for generating annotated building models on the basis of the scanned-in building blueprints and for outputting the building models as annotated versions of the building blueprints.

The apparatus SP has a processor for carrying out method steps of the method according to embodiments of the invention and a memory, coupled to the processor, for storing data needing to be processed.

In the present exemplary embodiment, a conventional blueprint BP of a building is scanned in by the scanner SC. The building may be for example a public or private building, a residential building, an office building, a factory building or another building. The blueprint BP depicts a multiplicity of building elements, such as e.g. walls, ceilings, floors, windows, doors, stairs and/or other construction elements as graphical objects OB, in particular in the form of symbols, reference signs, pictograms or other depictions. For reasons of clarity, only two respective objects OB are depicted explicitly in FIG. 1.

Furthermore, the blueprint BP contains a creator indication SRC, for example a company name, a company logo, a signature and/or a company stamp of a creator of the blueprint BP. The creator can be a designer, an engineer's office, an architect's office, a supplier, a creation tool and/or another entity involved in creating the blueprint BP. The creator indication SRC identifies the relevant creator.

The scanned-in blueprint is an initial digital building model IM of the building. Alternatively, or additionally, the initial digital building model used can also be a 2-dimensional or 3-dimensional scan of the building or a CAD or BIM model of the building.

The initial building model IM is analyzed by a pattern recognition method OCR that is implemented in the combination device SP and coupled to the scanner SC. The pattern recognition method may be realized for example by an image processing method and/or by a text recognition method, what is known as an OCR method (OCR: optical character recognition). It is an aim of the analysis to detect the creator indication SRC contained in the initial building model IM and to extract the text content of the creator indication, and also to detect objects OB contained in the initial building model IM. For detection purposes, graphical elements of the initial building model IM are correlated with stipulated graphical patterns.

Such a correlation can be ascertained for example by a similarity comparison or by a 2-dimensional correlation integral. Furthermore, the graphical elements can be correlated with the graphical patterns in respect of their position. As such, it is advantageously possible to make use of a convention according to which creator indications are preferably arranged in a corner of the blueprint BP. Furthermore, the graphical elements can be correlated with the graphical patterns in respect of their categorization into a hierarchy of the building. Such a building hierarchy can be based for example on the building comprising multiple stories that for their part each contain multiple rooms, which in turn can each comprise multiple walls, doors or other room elements.

According to embodiments of the invention, the pattern recognition method OCR first looks for the creator indication SRC in the initial building model IM, e.g. on the basis of a stipulated pattern for typical creator indications, and extracts the text content thereof. The text content is likewise referred to as creator indication SRC below. The creator indication SRC is transmitted by the pattern recognition method OCR to a database DB of the combination device SP.

The database DB contains a multiplicity of creator-specific object pattern libraries, only three object pattern libraries BIB, BIB1 and BIB2 from which are depicted explicitly in FIG. 1 for reasons of clarity. The object pattern library BIB is assigned to the creator indication SRC, the object pattern library BIB1 is assigned to a creator indication SRC1 and the object pattern library BIB2 is assigned to a creator indication SRC2 in this instance. The creator indications SRC, SRC1 and SRC2 respectively identify the creator to which the relevant object pattern library BIB, BIB1 or BIB2 is assigned.

In the present exemplary embodiment, the creator-specific object pattern libraries BIB, BIB1 and BIB2 each contain building element pattern representations specific to or characteristic of the assigned creator. A respective pattern representation for a building element has an assigned semantic building element data record describing this building element. Such pattern representations are also referred to as object patterns below. A respective building element data record preferably indicates a function, a significance, a use, a property and/or other parameters of the relevant building element.

The transmitted creator indication SRC is taken as a basis for the database DB to select and load the object pattern library BIB assigned to this creator indication SRC. The object pattern library BIB typically contains a multiplicity of creator-specific object patterns having a respectively assigned building element data record. The object patterns provided for may be for example creator-specific pattern representations of symbols for doors, radiators, fire alarms or motors, which have the assigned relevant term "door", "radiator", "fire alarm" or "motor", respectively, if need be together with an additional description as a building element data record. For reasons of clarity, FIG. 1 depicts only a single creator-specific object pattern OM for a building element explicitly, which has an assigned building element data record EL describing this building element.

The object pattern OM is supplied to the pattern recognition method OCR, which attempts to detect or find this object pattern OM in the initial building model IM. In the present exemplary embodiment, correlation with the object pattern OM detects the objects OB in the initial building model IM as instances of the object pattern OM or of the building element represented thereby.

The pattern recognition method OCR can preferably also be used to extract a respective room descriptor from the initial building model IM for a detected object OB. This object OB can thus be assigned to a position or a room in the building.

According to embodiments of the invention, the instances OB of the object pattern OM are intended to be annotated by the building element data record EL assigned to this object pattern OM. For this purpose, the initial building model IM is read in by a model generator GEN coupled to the pattern recognition method OCR. Furthermore, the building element data record EL assigned to the object pattern OM is supplied to the model generator GEN from the object pattern library BIB. The model generator GEN then assigns to the building element data record EL all of the objects OB detected as instances of the object pattern OM as an annotation. In this way, the initial building model IM is expanded by the assigned annotations.

The expanded building model IM is converted by the model generator GEN preferably into a BIM model, which is output and stored as an annotated digital building model DM of the building preferably in an IFC format (IFC: industry foundation classes). On the basis of the machine-readable semantic annotations it is usually easy to derive use-specific building models, e.g. for energy simulations, for cleaning schedules, for maintenance schedules and/or for positioning fire alarms, from the digital building model DM.

In the present exemplary embodiment, the annotated digital building model DM is output via the printer PR. The latter prints the annotated digital building model DM in the form of an annotated blueprint ABP of the building. The annotations EL are preferably positioned adjacently to the respective objects OB.

Figure 2:
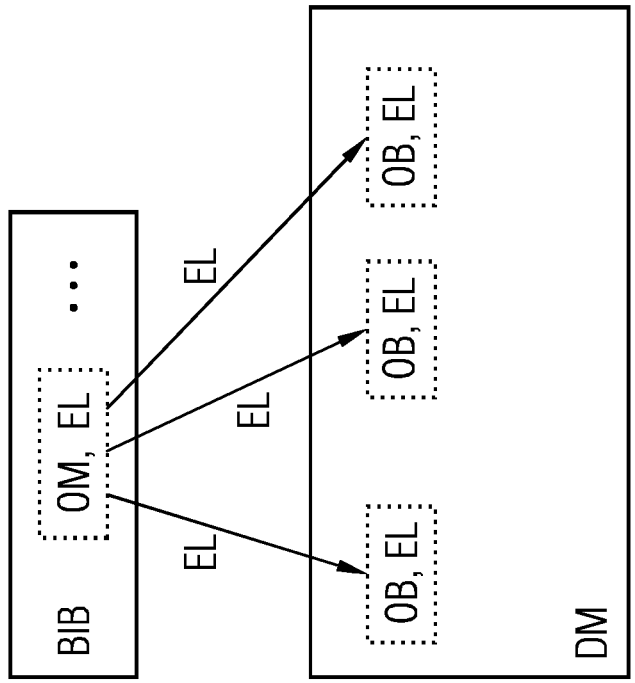
FIG. 2 illustrates annotation of building elements.
Figure 2:
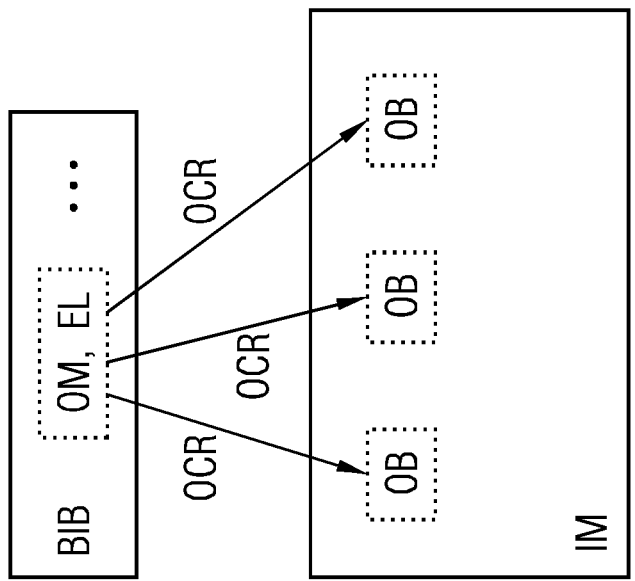

FIG. 2 illustrates annotation of building elements in a more detailed depiction. Where FIG. 2 uses the same or corresponding reference signs as FIG. 1, these denote the same or corresponding entities, which are preferably implemented or realized as described above.

As indicated in the left-hand portion of FIG. 2, the pattern recognition method OCR first looks for and detects instances OB of the object pattern OM in the digital building model IM. The detected instances OB are then, as indicated in the right-hand portion of FIG. 2, respectively assigned the building element data record EL associated with the object pattern OM as an annotation.

Figure 3:
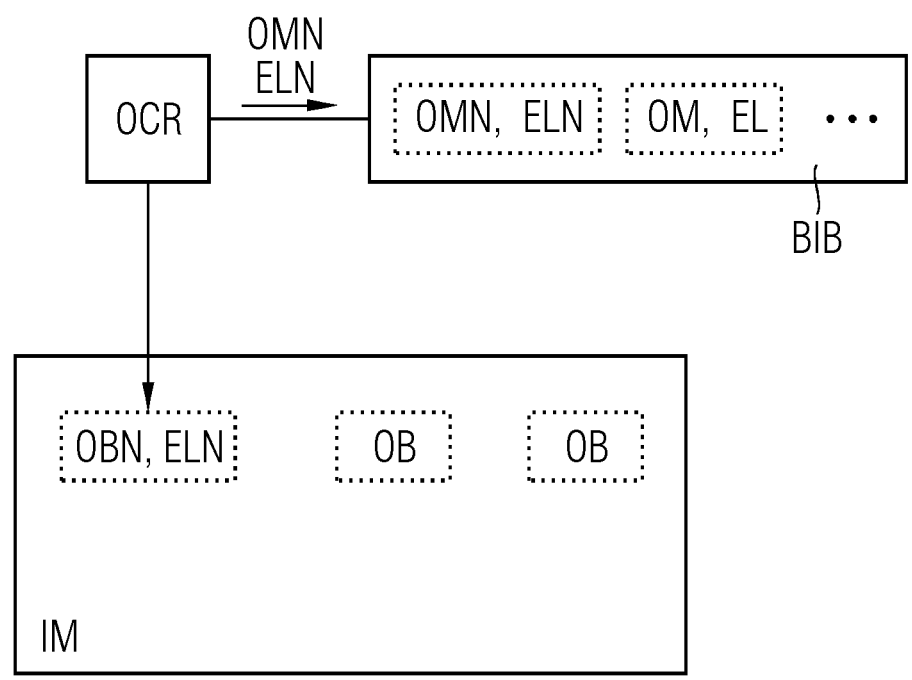
FIG. 3 illustrates an extension of a creator-specific object library.

FIG. 3 illustrates an extension of the creator-specific object pattern library BIB. Where FIG. 3 uses the same or corresponding reference signs as the preceding figures, these denote the same or corresponding entities, which are preferably implemented or realized as described above.

Such an extension of object pattern libraries can take place in particular in the course of operation of the method described above. Following selection of a respective creator-specific object pattern library, in this instance BIB, the pattern recognition method OCR is used to attempt to find a local correlation between further objects and further annotations in the initial building model IM. Further objects that are respectively adjacent to a further annotation can preferably be sought. Furthermore, for example a legend from the initial building model IM can be sought and/or captured, in which further objects are compared with further annotations locally.

It may be assumed for the present exemplary embodiment that the pattern recognition method OCR finds a further object OBN in whose immediate vicinity a further annotation ELN is detected.

The further object OBN that is found is then sought in the selected object pattern library BIB by correlation with the object patterns contained therein, in this case OM. For this purpose, similarity comparisons can preferably be performed by a support vector machine. If the further object OBN is not found in the selected object pattern library BIB, the further object OBN in the form of a new object pattern OMN and the further annotation ELN as a new building element data record are stored in the selected object pattern library BIB in a manner assigned to one another. Otherwise the further object OBN can be stored in the selected object pattern library BIB as a further manifestation of an already known object pattern, in this case OM, with the latter as an alternative representation.

In this way, the method according to embodiments of the invention can be started with object pattern libraries that contain only a few or no object patterns, in order to progressively expand the object pattern libraries with new object patterns and new building element data records in the course of operation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or an throughout this application does not exclude a plurality, and "comprising" does not exclude other steps or elements. The mention of a "unit" or a "module" does not preclude the use of more than one unit or module.

The invention claimed is:

1. A computer-implemented method for generating a digital building model, the method comprising:
   a) reading in an initial building model;
   b) extracting a creator indication about a creator of the initial building model from the initial building model using a pattern recognition method;
   c) selecting a creator-specific object pattern library from a multiplicity of creator-specific object pattern libraries based on the creator indication, and loading the creator-specific object pattern library in which a respective object pattern has an assigned building element data record;
   d) correlating the respective object pattern with objects of the initial building model by a pattern recognition method;
   e) assigning an object correlating with the respective object pattern the building element data record assigned to the object pattern as an annotation; and
   f) generating and outputting an annotated digital building model, wherein the initial building model and the assigned annotations are taken as a basis for the generating and outputting the annotated digital building model;
      wherein a coordinate indication is extracted from the initial building model, and in that the initial building model and/or the annotated digital building model is scaled on a basis of a captured coordinate indication.

2. The method as claimed in claim 1, wherein a local correlation of a further object with a further annotation is captured in the initial building model by the pattern recognition method, and in that the further annotation as a building element data record and the further object in a form of a further object pattern are stored in the creator-specific object pattern library in a manner assigned to one another.

3. The method as claimed in claim 2, wherein the storage of the further object pattern and/or of the further annotation is logged in a blockchain.

4. The method as claimed in claim 2, wherein
   the further object is correlated with object patterns contained in the creator-specific object pattern library, and
   if the further object correlates with an object pattern contained in the creator-specific object pattern library then the further object pattern is stored in the creator-specific object pattern library as an additional representation of this object pattern; and/or
   otherwise the further object pattern is stored in the creator-specific object pattern library in a manner assigned to the further annotation.

5. The method as claimed in claim 1, wherein the annotation assigned to a respective object is output in a manner positionally assigned to this object.

6. The method as claimed in claim 1, wherein the initial building model is produced by scanning in a building blueprint.

7. The method as claimed in claim 1, wherein the method takes place on a scanner or on a scanner/printer combination device.

8. An apparatus for generating a digital building model, configured to carry out the method as claimed in claim 1.

9. A computer program product, comprising a computer readable hardware storage device having computer readable program code stored therein, said program code executable by a processor of a computer system to implement the method, as claimed in claim 1.

10. A computer-readable storage medium having a computer program product as claimed in claim 9.

11. A computer-implemented method for generating a digital building model, the method comprising:
    a) reading in an initial building model;
    b) extracting a creator indication about a creator of the initial building model from the initial building model using a pattern recognition method;
    c) selecting a creator-specific object pattern library from a multiplicity of creator-specific object pattern libraries based on the creator indication, and loading the creator-specific object pattern library in which a respective object pattern has an assigned building element data record;
    d) correlating the respective object pattern with objects of the initial building model by a pattern recognition method;
    e) assigning an object correlating with the respective object pattern the building element data record assigned to the object pattern as an annotation; and
    f) generating and outputting an annotated digital building model, wherein the initial building model and the assigned annotations are taken as a basis for the generating and outputting the annotated digital building model;
       wherein a local correlation of a further object with a further annotation is captured in the initial building model by the pattern recognition method, and in that the further annotation as a building element data record and the further object in a form of a further object pattern are stored in the creator-specific object pattern library in a manner assigned to one another, further wherein:
       the further object is correlated with object patterns contained in the creator-specific object pattern library, and
       if the further object correlates with an object pattern contained in the creator-specific object pattern library then the further object pattern is stored in the creator-specific object pattern library as an additional representation of this object pattern; and/or
       otherwise the further object pattern is stored in the creator-specific object pattern library in a manner assigned to the further annotation.

12. The method as claimed in claim 11, wherein the storage of the further object pattern and/or of the further annotation is logged in a blockchain.

13. The method as claimed in claim 11, wherein the annotation assigned to a respective object is output in a manner positionally assigned to this object.

14. The method as claimed in claim 11, wherein the initial building model is produced by scanning in a building blueprint.

15. The method as claimed in claim 11, wherein the method takes place on a scanner or on a scanner/printer combination device.

16. An apparatus for generating a digital building model, configured to carry out the method as claimed in claim 11.

17. A computer program product, comprising a computer readable hardware storage device having computer readable program code stored therein, said program code executable by a processor of a computer system to implement the method, as claimed in claim 11.

18. A computer-readable storage medium having a computer program product as claimed in claim 17.

* * * * *